US012527777B2

(12) United States Patent
Nikolakakis

(10) Patent No.: US 12,527,777 B2
(45) Date of Patent: Jan. 20, 2026

(54) SUSTAINED RELEASE PYRIDOSTIGMINE COMPOSITIONS

(71) Applicant: VIANEX S.A., Attiki (GR)

(72) Inventor: Ioannis Nikolakakis, Panorama Thessaloniki (GR)

(73) Assignee: VIANEX S.A., Attiki (GR)

( * ) Notice: Subject to any disclaimer, the term of this patent is extended or adjusted under 35 U.S.C. 154(b) by 1259 days.

(21) Appl. No.: 17/047,800

(22) PCT Filed: Apr. 16, 2019

(86) PCT No.: PCT/EP2019/059789
§ 371 (c)(1),
(2) Date: Nov. 5, 2020

(87) PCT Pub. No.: WO2019/201909
PCT Pub. Date: Oct. 24, 2019

(65) Prior Publication Data
US 2021/0128539 A1    May 6, 2021

(30) Foreign Application Priority Data
Apr. 16, 2018 (EP) ...................................  18386007

(51) Int. Cl.
*A61K 31/4425* (2006.01)
*A61K 9/20* (2006.01)
(52) U.S. Cl.
CPC ........ *A61K 31/4425* (2013.01); *A61K 9/2027* (2013.01); *A61K 9/2054* (2013.01); *A61K 9/2095* (2013.01)
(58) Field of Classification Search
None
See application file for complete search history.

(56) References Cited

U.S. PATENT DOCUMENTS 7,413,750 B2 *  8/2008  Kolter  .................  A61K 9/1635
424/494

FOREIGN PATENT DOCUMENTS

| EP | 1166776 A2 | 1/2002 |
| WO | WO-2009092601 A1 | 7/2009 |
| WO | WO-2015166473 A1 | 11/2015 |
| WO | WO-2019201909 A1 | 10/2019 |

OTHER PUBLICATIONS

Tan et al. "Nanosized Sustained-Release Pyridostigmine Bromide Microcapsules: Process Optimization and Evaluation of Characteristics". International Journal of Nanomedicine. 2013; 8:737-745. (Year: 2013).*

Huang et al. "Formulation Design of a Highly Hygroscopic Drug (Pyridostigmine Bromide) for its Hygroscopic Character Improvement and Investigation of In Vitro/In Vivo Dissolution Properties". Drug Development and Industrial Pharmacy. 2007; 33:403-416. (Year: 2007).*
N. Follonier et al "Various ways of modulating the release of diltiazem hydrochloride fromhot-melt extruded sustained release pellets prepared using polymeric materials" Journal of Controlled Release 36, pp. 243-250 (1995).
T. Avgerinos et al "Mechanical properties and drug release of venlafaxine HCI wolid mini matrices prepared by hot-melt extrusion and hot or ambient compression" Drug Development and Industrial Pharmacy, 44:2, pp. 338-348 (2017).
International Search Report and Written Opinion of the International Searching Authority, issued in PCT/EP2019/059789 mailed Jul. 2, 2019; ISA/EP.
Qunyou Tan et al., "Nanosized sustained-release pyridostigmine bromide microcapsules: process optmization and evaluation of characteristics," International Journal of Nanomedicine, 2013; 8: 737-745, found online: https://www.ncbi.nlm.nih.gov/pmc/articles/PMC3582480/. (9 pages).
Search Report dated Oct. 3, 2022 for corresponding Russian Application No. 2020137110 with English Translation. (4 pages).
Russian Office Action dated Oct. 4, 2022 from corresponding Russian Application No. 2020137110 with English translation. (13 pages).
T. Avgerinos et al "Mechanical properties and drug release of venlafaxine HCI solid mini matrices prepared by hot-melt extrusion and hot or ambient compression" Drug Development and Industrial Pharmacy 44:2, 338-348 (2018).
W. Grymonpre et al "The impact of hot-melt extrusion on the tableting behaviour of polyvinyl alcohol", International Journal of Pharmaceutics 498; pp. 254-262 (2016).
R. Iyer et al "The impact of hot melt extrusion and spray drying on mechanical properties and tableting indices of materials used in pharmaceutical development", Journal of Pharmaceutical Sciences 102:3604-3613 (2013).
D. Jones et al "Characterisation and modelling of the thermorheological properties of pharmaceutical polymers and their blends using capillary rheometry: Implications for hot melt processing of dosage forms", International Journal of Pharmaceutics 493, 251-259 (2015).
W. Kluwe et al "Pharmacological and Toxicological Evaluation of Orally Administered Pyridostigmine in Dogs", Fundamental and Applied Toxicology 14, 40-53 (1990).
B. Lang et al "Hot-melt extrusion—basic principles and pharmaceutical applications", Drug Development and Industrial Pharmacy, 40:9 1133-1155 (2014).
X. Liu, et al "Microspheres of corn protein, zein, for an ivermectin drug delivery system" Biomaterials 26, 109-115 (2005).
N. Parris "Extraction and Solubility Characteristics of Zein Proteins from Dry-Milled Corn", J. Agric. Food Chem. 49, 3757-3760 (2001).
H. Patil, et al "Hot-Melt Extrusion: from Theory to Application in Pharmaceutical Formulation" AAPS PharmSciTech, vol. 17, No. 1 (2016).

(Continued)

*Primary Examiner* — Leslie A. Royds Draper

(57) ABSTRACT

Sustained release pharmaceutical compositions comprising a therapeutically effective amount of pyridostigmine or a pharmaceutically acceptable salt thereof, a diluent, and a copolymer comprising polyvinyl acetate and polyvinylpyrrolidone, wherein the compositions are produced by hot-melt extrusion.

14 Claims, 3 Drawing Sheets

(56) References Cited

OTHER PUBLICATIONS

S. Schilling et al "Citric acid monohydrate as a release-modifying agent in melt extruded matrix tablets", International Journal of Pharmaceutics 361, 158-168 (20018).

Z. Shao, et al "Effects of Formulation Variables and Post-compression Curing on Drug Release from a New Sustained-Release Matrix Material: Polyvinylacetate-Povidone", Pharmaceutical Development and Technology, 6:2, 247-254 (2001).

O. Sprockel et al A melt-extrusion process for manufacturing matrix drug delivery systems, International Journal of Pharmaceutics 155; 191-197 (1997).

P. Taylor "Anticholinesterase Agents", Neuropharmacology, Section II (1980).

R. Tiwari et al Contribution of hot-melt extrusion technology to advance drug delivery in the 21st Century, Expert Opinion on Drug Delivery, 13:3, 451-464 (2016).

J. Varshosaz, et al "Preparation and Characterization of Metoprolol Controlled-Release Solid Dispersions", Drug Delivery, 13: 295-302 (2006).

M. Velasco-De-Paola et al "Dissolution Kinetics Evaluation of Controlled-Release Tablets Containing Propranolol Hydrochloride", Drug Development and Industrial Pharmacy, 25(4), 535-541 (1999).

W. Zheng et al "Properties of theophylline tablets powder-coated with methacrylate ester copolymers", J. Drug Del. Sci. Tech., 14(4) 319-325 (2004).

Y. Zhu et al "Influence of Plasticizer Level on the Drug Release from Sustained Release Film Coated and Hot-Melt Extruded Dosage Forms" Pharmaceutical Development and Technology, 11: 285-294 (2006).

* cited by examiner

SUSTAINED RELEASE PYRIDOSTIGMINE COMPOSITIONS

CROSS-REFERENCE TO RELATED APPLICATIONS

This application is a 371 U.S. National Phase of International Application No. PCT/EP2019/059789, filed Apr. 16, 2019, which claims priority to European Patent Application No. 18386007.1, filed Apr. 16, 2018. The entire disclosures of the above applications are incorporated herein by reference.

TECHNICAL FIELD OF THE INVENTION

The invention relates to sustained release pharmaceutical compositions comprising pyridostigmine or a pharmaceutically acceptable salt thereof.

BACKGROUND OF THE INVENTION

Pyridostigmine is a cholinesterase inhibitor administered for the therapy of neuromuscular disorders that result from autoimmune disease (myasthenia gravis) and also from non-autoimmune related myasthenic syndromes. The chemical name of pyridostigmine is (1-methylpyridin-1-ium-3-yl) N,N-dimethylcarbamate. The role of pyridostigmine is to inhibit the action of acetylcholinesterase via carboxylation, thus decreasing hydration of acetylcholine (Kluwe et al 1990, Taylor 1980). It was approved as a medicine in the form of its bromide salt from the FDA in 1995 (Mestinon® tablets, NDA 009-829) for the treatment of myasthenia gravis (MG). This disease affects the muscles of the body and particularly the muscles of the face (eyes, mouth and swelling) and causes weakening of the skeletal muscles and feeling of weakness after physical exercise. It is estimated that worldwide the number of myasthenic patients exceeds 150 per million with nearly one million MG patients worldwide. The yearly incidence is 10-15 per million per year (Nils Erik Gilhus et al. Myasthenia Gravis: A Review of Available Treatment Approaches. Autoimmune Diseases. Volume 2011 (2011), Article ID 847393, 6 pages). Because of its short biological half-life (2-3 hours) and the relative low dose (60 mg per instant release tablet) it is possible to develop a new sustained release form. This is very desirable since the frequency of administration is reduced from 3 times (60 mg) to 1 time (180 mg) per day, which in turn improves considerably compliance of the patients to the dosing scheme with reduction of the side effects and improvement of the therapeutic efficacy. A sustained release tablet comprising pyridostigmine bromide has been marketed in the USA under the name Mestinon® Timespan.

Tablet is the preferred dosage form for the oral administration of medicines for certain reasons. It is a handy dosage form occupying small volume, and therefore it is easy to transfer and store thus assisting patient compliance, precise dosing due to good weight uniformity and considerably less production cost compared to other dosage forms due to available high speed machinery enabling high production rate. Direct compression is the preferred method of tableting because it is simple, quick and cost-effective (Shangraw et al. 1993. A survey of current industrial practices in the formulation and manufacture of tablets and capsules. Pharm. Technol. 17:32-32). For this reason, many companies have introduced high performance direct compression grades for manufacturing high dose drugs. Among them, multifunctional excipients (Pharmaceutical Development and Technology, 6(2), 247-254 (2001)) is a current trend in matrix type sustained release tablets since, besides improving tabletability they can function as sustained release agents for drug release (Shao et al. 2002, Effects of Formulation Variables and Post-compression Curing on Drug Release from a New Sustained-Release Matrix Material: Polyvinylacetate-Povidone Pharmaceutical Development and Technology 6(2), pp. 247-254). In addition, they may have favourable characteristics such as relatively low glass transition temperature and stability in a wide temperature range.

The sustained release action of Mestinon® Timespan tablets is obtained using carnauba waxes and corn derived proteins (zein) which however may be criticized for variability in their purity compared to synthetic excipients and retarding agents, difficulty with disintegration under physiological conditions (Liu, X. M., Sun, Q. S., Wang, H. J., Zhang, L. and Wang, J. Y. Microspheres of Corn Protein, Zein, for an Ivermectin Drug Delivery System, Biomater., 2005: 26: 109-115) and the high cost of zein (Parris, N., Dickey, L. C. 2004 ACS National Meeting Book of Abstracts 228(1), pp. CELL-98).

Pyridostigmine and its pharmaceutically acceptable salts are highly hygroscopic. For example, pyridostigmine bromide is extremely sensitive to environmental humidity, exhibiting deliquescence at 33% relative humidity (RH). Therefore, pharmaceutical compositions comprising pyridostigmine or its pharmaceutically acceptable salts must provide protection of the active ingredient from environmental humidity.

In the development of generic pharmaceutical products the developed product must be bioequivalent to the reference product. In the case of a sustained release product the release profile of the generic and the reference product must be similar over a wide pH range. Therefore, there is a need to provide pyridostigmine compositions exhibiting the sustained release profile of the Mestinon® Timespan tablets, which however do not show the disadvantages of the commercially available product.

Hot-melt extrusion is a new production method that is gaining importance and has attracted great interest as it is continuous and the extrudate can be easily cut into uniform size pellets, giving dosage forms comprising multiple units (pellets), which are regarded as advantageous compared to single unit direct compression tablets from a biopharmaceutical point of view (gastrointestinal distribution and transit). Also because of the strong intermolecular bonding and coherent matrix, sustained release is achieved from each of the multiple units despite of their small size restricting the diffusion path (Avgerinos et al., 2017, Mechanical properties and drug release of venlafaxine HCl solid mini matrices prepared by hot-melt extrusion and hot or ambient compression Drug Dev Ind Pharm, 2018 Vol. 44, No. 2, 338-348). For the same reason, processing of powdered extrudate into tablets gives sustained release. Therefore, hot-melt extrusion has been applied for the retardation or modification of the release of many water soluble drugs (Follonier N, Doelker E, Cole T E. Various ways of modulating the release of diltiazem hydrochloride from hot-melt extruded sustained release pellets prepared using polymeric materials. J Control Release. 1995; 36:243-250. Velasco-De-Paola R V M, Santoro MIRM, Gai N M. Dissolution kinetics evaluation of controlled-release tablets containing propranolol hydrochloride. Drug Dev Ind Pharm. 1999; 25:535-541.; Zheng W, Cerea M, Sauer D, et al. Properties of theophylline tablets powder-coated with methacrylate ester copolymers. J Drug Deliv Sci Tech. 2004; 14:319-332.; Fukuda M, Peppas A N, McGinity W J. Floating hot-melt extruded tablets for gastroretentive controlled drug release system. J Control Release. 2006; 115:121-129.; Varshosaz J, Faghihian H, Rastgoo K. Preparation and characterization of metoprolol controlled-release solid dispersions. Drug Deliv. 2006; 13:295-302.; Schilling U S, Bruce D C, Shah H N, et al. Citric acid monohydrate as a release-modifying agent in melt extruded matrix tablets. Int J Pharm. 2008; 361:158-168). Latest developments in hot-melt extrusion together with approved commercial products have been reported in recent reviews (Lang B, McGinity W J, Williams III. Hot-melt extrusion-basic principles and pharmaceutical applications. Drug Dev Ind Pharm. 2014; 40:1133-1155.; Tiwari V R, Patil H, Repka A M. Contribution of hot-melt extrusion technology to advance drug delivery in the $21^{st}$ century. Expert Opin Drug Deliv. 2016; 13:451-464).

In hot-melt extrusion process, polymers are used together with plasticizers in order to enable smooth extrusion resulting in acceptable product texture, reduced residence time in the extruder and hence reduced risk of degradation (Zhu Y, Mehta A K, McGinity W J. Influence of plasticizer level on the drug release from sustained release film coated and hot-melt extruded dosage forms. Pharm Dev Technol. 2006; 11:285-294.; Patil H, Tiwari V R, Repka A M. Hot-melt extrusion: from theory to application in pharmaceutical formulation. AAPS PharmSciTech. 2016; 17:20-42). The plasticizers occupy sites along the polymer chain, weaken polymerpolymer chain secondary bonding and provide greater mobility for the macromolecules, resulting in a softer mass structure which is reflected in its rheological properties (Jones S D, Margetson N D, McAllister S M, et al. Characterization and modelling of the thermorheological properties of pharmaceutical polymers and their blends using capillary rheometry: implications for hot melt processing of dosage forms. Int J Pharm. 2015; 493:251-259).

In general, differences in drug release from solid matrices prepared with different methods are ascribed to the different structure or mechanism of matrix formation affecting drug transport upon hydration. In the case of hot-melt extrusion, differences in release are ascribed to the intermolecular interactions and extensive solid bridges network formed by the molten polymer after cooling, which increases compact tortuosity, and to increase of the free volume of polymer during heating as well, which enables intense packing of the drug within matrix structure after cooling (Crowley et al., 2004).

SUMMARY OF THE INVENTION

The present invention provides sustained release pharmaceutical composition comprising a therapeutically effective amount of pyridostigmine or a pharmaceutically acceptable salt thereof, a diluent and a copolymer comprising polyvinyl acetate and polyvinylpyrrolidone, wherein the composition is produced by hot-melt extrusion.

The present invention also provides sustained release oral pharmaceutical forms comprising the above-mentioned composition.

The compositions of the present invention exhibit pH-independent sustained release. This is achieved by the presence of the copolymer comprising polyvinyl acetate and polyvinylpyrrolidone which acts as a polymeric matrix carrier. Pyridostigmine, or its pharmaceutically acceptable salt, during hot melt extrusion forms solid dispersion with the polymeric carrier. After cooling and milling of the extruded product to powder, the active ingredient is effectively embedded inside the polymer matrix which renders pH independent release in contact with the gastric or intestine fluids. The release profile of the compositions of the present invention is similar to the release profile of the commercially available Mestinon® Timespan tablets.

The compositions of the present invention exhibit excellent physical characteristics, such as flowability and tabletability and provide protection of the active ingredient from environmental humidity.

DETAILED DESCRIPTION OF THE INVENTION

Figure 1:
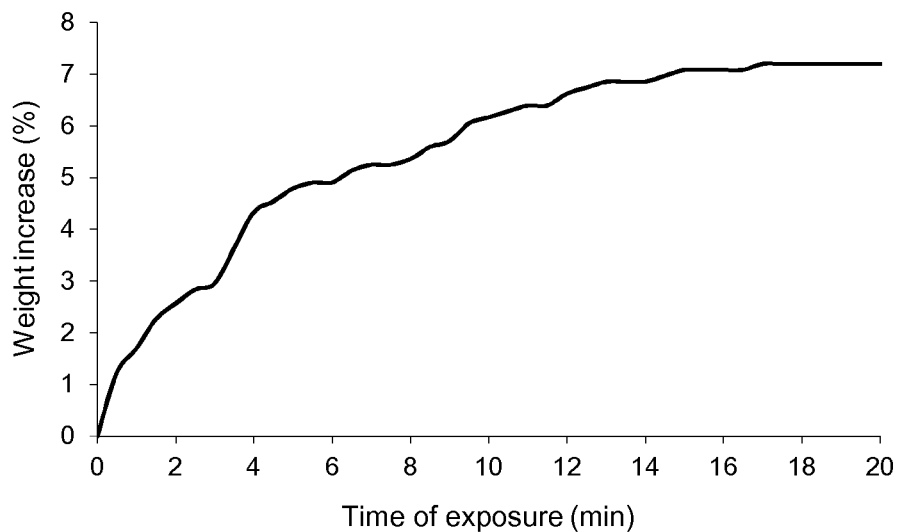
FIG. 1 shows the effect of the environmental relative humidity on the adsorption of water vapour by pyridostigmine bromide.

The present invention provides sustained release pharmaceutical compositions of an active pharmaceutical ingredient which is extremely sensitive to environmental humidity, exhibiting deliquescence at 33% relative humidity (RH). FIG. 1 shows the effect of relative humidity on the adsorption of water vapour on pyridostigmine bromide.

Thus, the present invention provides a sustained release pharmaceutical composition comprising a therapeutically effective amount of pyridostigmine or a pharmaceutically acceptable salt thereof, a diluent and a copolymer comprising polyvinyl acetate and polyvinylpyrrolidone in a ratio from 3:1 to 5:1, wherein the composition is produced by hot-melt extrusion.

Preferably, the pharmaceutically acceptable salt of pyridostigmine is pyridostigmine bromide.

Examples of diluents which can be used in the compositions of the present invention include microcrystalline cellulose, lactose, calcium phosphate salts, hydrophilic colloids, polysaccharides or mixtures thereof. Preferably, the diluent is microcrystalline cellulose.

Preferably, the concentration of the copolymer in the compositions of the present invention is from 50% w/w to 70% w/w. More preferably, the concentration of the copolymer in the compositions of the present invention is from 60% w/w to 65% w/w.

Preferably, the diluent concentration in the compositions of the present invention is from 5% w/w to 25% w/w. More preferably, the diluents concentration in the compositions of the present invention is from 10% w/w to 15% w/w.

Preferably, the concentration of pyridostigmine, or a pharmaceutically acceptable salt thereof in the compositions of the present invention is from 5% w/w to 45% w/w. More preferably, the concentration of pyridostigmine, or a pharmaceutically acceptable salt thereof is from 15% w/w to 35% w/w.

The term % w/w refers to mg of that particular ingredient per 100 mg of the composition.

Copolymers comprising polyvinyl acetate and polyvinylpyrrolidone are well known in the art. The polyvinyl acetate component of the copolymer is a very plastic material that produces a coherent matrix even under low compression forces. When the compositions are introduced into the gastric or intestinal fluid, the water soluble polyvinylpyrrolidone (povidone) moiety is leached out to form pores through which the active ingredient slowly diffuses outwards. Furthermore, since the copolymer does not contain ionic groups it is inert to active ingredients. An example of a commercially available copolymer of polyvinyl acetate and polyvinylpyrrolidone according to the present invention is Kollidon® SR.

The compositions of the present invention may optionally comprise additional excipients, such as plasticizers, taste improving agents, bioadhesive and porogenic substances.

The compositions of the present invention are produced by hot-melt extrusion. This method is well known to a person skilled in the art. For example, the compositions of the present invention may be produced by the following process: The active ingredient, the copolymer and the diluents are mixed to give a homogeneous powder mixture. The mixture is then fed into an extruder, where under progressively elevated temperatures from 90° C. (feeding zone 1) to 115° C. (mixing and compression zone 2) and 120° C. (extrusion zone 3) it is transformed into a uniform melt of solid dispersion of the drug. In the end of the extrusion route a die is fitted and maintained at the same temperature as zone 3. The extrudate exits the die through an orifice of 1-2 mm diameter in the form of a string which is subsequently cut into pellets with the aid of cutter mill (pelletizer). These pellets can be either used as such in the production of unit dosage pharmaceutical forms, for example tablets or capsules, or converted to powder after milling and then used in the production of unit dosage pharmaceutical forms, following processes well known to a person skilled in the art.

The compositions of the present invention exhibit pH-independent sustained release. This is due to the active ingredient being embedded inside the polymer matrix which renders the release of the active ingredient in contact with the gastric or intestine fluids pH independent. This is achieved by the heating and intense mechanical shearing of the active ingredient/polymer/plasticizer mixture during hot-melt extrusion, resulting in a melt of homogeneously dispersed active ingredient in the polymeric matrix. After cooling, the melt solidifies producing a matrix of good mechanical strength. The matrix acts as protective shield when the compositions come to contact with the gastric fluids, releasing the active ingredient in a sustained release manner controlled by diffusion (Sproeckel et al 1997 A melt-extrusion process for manufacturing matrix drug delivery systems International Journal of Pharmaceutics 155 191-199). More importantly the structure and functionality of the matrix is not lost after milling the hot-melt extruded pellets into hot-melt extruded powder and processing into pharmaceutical forms, such as tablets or capsules. Furthermore, the sustained release profile of the compositions of the present invention is similar to the sustained release profile of the Mestinon® Timespan tablets in a wide pH range, which enables the production of oral dosage forms which are bioequivalent to Mestinon® Timespan tablets.

The compositions of the present invention provide excellent protection of the active ingredient from environmental humidity. Surprisingly, the protection provided by tablets according to the present invention is much better than the protection provided by tablets containing the same ingredients but prepared by direct compression of the same composition powder mixture which has not been subjected to hot-melt extrusion.

Furthermore, tablets of the present invention, prepared from a hot-melt extruded composition, exhibit excellent mechanical properties, such as high mechanical strength and low friability tensile strength. These properties are superior to the corresponding properties of tablets containing the same ingredients but prepared from a mixture of the ingredients which have not been subjected to hot-melt extrusion.

The fact that tablets prepared from a hot-melt extruded composition exhibit excellent mechanical properties was not expected, since previous work using different hot-melt extrusion polymers points to a decrease of mechanical strength of powdered hot-melt extruded product that may adversely affects its further processing into final dosage form. In particular, the work of Iyer et al. (The Impact of Hot Melt Extrusion and Spray Drying on Mechanical Properties and Tableting Indices of Materials Used in Pharmaceutical Development Journal of Pharmaceutical Sciences, Vol. 102, 3604-3613 (2013)) on hypromellose acetate succinate (HPMCAS) and copovidone, concluded that hot-melt extrusion may impact reworkability by reducing deformation of materials and by increasing density due to heating and shear stress in a screw extruder, resulting in decreased tensile strength. Also, the work of Grymonpre et al. (The impact of hot-melt extrusion on the tableting behaviour of polyvinyl alcohol, International Journal of Pharmaceutics Volume 498, Issues 1-2, 10 Feb. 2016, Pages 254-2621) points to the fact that the decrease of mechanical strength of tablets prepared from hot-melt extruded powder is due to the higher amorphous content in the formulation (as a result of hot-melt extrusion) decreasing bond strength and increasing elastic deformation and tablet elastic recovery. Therefore, lower tensile strengths were expected from a combined effect of less interparticulate bonding areas (because of higher elastic recovery) and weaker bonding strengths per unit bonding area (between particles consisting of amorphous content).

The compositions of the present invention may comprise a coating layer, for example, in order to improve the per os uptake of the unit dosage forms by the patients. Coating agents as well as processes for the introduction of a coating layer are well known to a person skilled in the art.

EXAMPLES

Example 1. Sustained Release Pellets Prepared by Hot-Melt Extrusion

This example shows the preparation of pellets according to the present invention containing pyridostigmine bromide as active ingredient. The pellets also contain a copolymer comprising polyvinyl acetate and polyvinylpyrrolidone in a ratio from 3:1 to 5:1 (Kollidon® SR) and microcrystalline cellulose (Avicel pH 102) as shown in Table 1.

TABLE 1

Composition of pellets

| Component | Weight percentage (% w/w) |
|---|---|
| Pyridostigmine bromide | 25 |
| Kollidon SR | 60 |
| Avicel pH 102 | 15 |
| Total | 100 |

For the preparation of the pellets the following steps were applied:

a) The components were mixed in a Turbula mixer to give homogeneous mixture.

b) The mixture was fed into a bench-type vertical single-screw extruder (Model RCP-0250 Microtruder, Randcastle Extrusion Systems, Cedar Grove, N.J., USA).

d) The hot-melt extruded rod-shape product was passed next through a pelletizer with rotating blades (Micropelletizer, Randcastle Extrusion Systems, Cedar Grove, N.J., USA) Randcastle) to obtain the hot-melt extruded pellets.

Extrusion Conditions:

Temperature of the zones of the extruder barrel:

Zone 1 120° C., Zone 2 135° C., Zone 3 135° C., Zone 4 135° C.

Rotation speed of the screw: 60 rpm

Example 2. Sustained Release Tablets Prepared by Direct Compression of Hot-Melt Extruded Powder This example shows the preparation and release characteristics of sustained release tablets of pyrisdostigmine bromide prepared by direct compression of the composition of Example 1.

The hot-melt extruded pellets of Example 1 were converted into powder form after milling with a cutting mill. The powder had good rheological behavior and tableting properties and tablets were produced using the automatic tableting machine Erweka-Korsch with good quality and good mechanical strength without using any tableting aids (except from lubricants).

Figure 2:
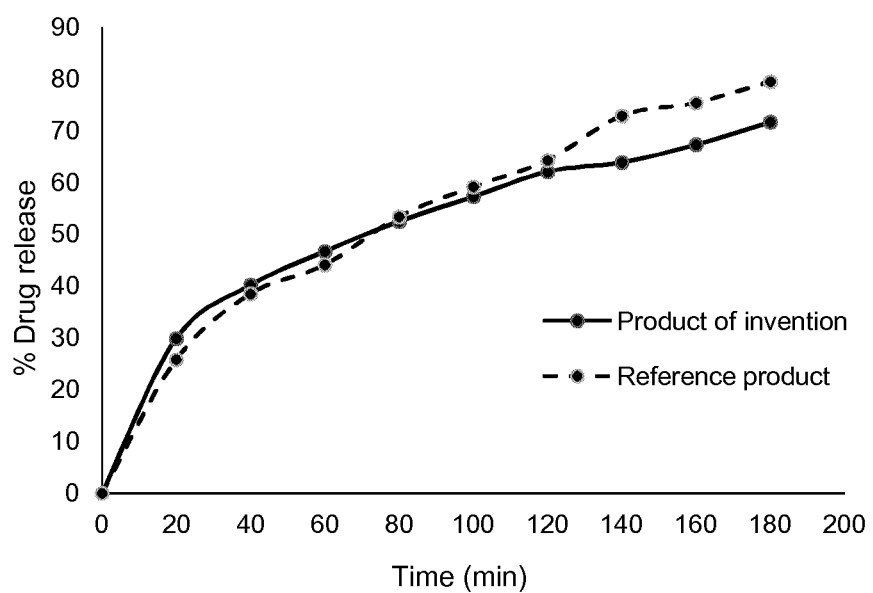
FIG. 2 shows comparative plots of the amount of pyridostigmine bromide released from tablets prepared by direct compression of hot-melt extruded powder and reference product at pH 1.2.

Tableting machine: Erweka-Korsch
Die and punches: 12 mm
Compression pressure for tableting: 1500 psi
Tablet weight 720 mg Table 2 shows the amount of pyridostigmine bromide (PB) released from the tablets of the invention compared to the corresponding release from Mestinon® Timespan tablets (reference product) at pH 1.2. The value f2 in Table 2 is the similarity factor. A value of f2 between 50 and 100 indicates similarity between two dissolution profiles. The graphic representation of the results of Table 2 are shown in FIG. 2.

TABLE 2

Comparative release at pH 1.2

| | % PB released | | |
|---|---|---|---|
| Time (min) | Product of invention | Reference product | $f_2$ |
| 20 | 29.9 | 25.8 | 68.9 |
| 40 | 40.2 | 38.5 | 74.3 |
| 60 | 46.7 | 44.1 | 75.2 |
| 80 | 52.5 | 53.4 | 77.7 |
| 100 | 57.3 | 59.2 | 78.6 |
| 120 | 62.1 | 64.3 | 78.9 |
| 140 | 63.9 | 72.9 | 68.9 |
| 160 | 67.3 | 75.4 | 65.6 |
| 180 | 71.7 | 79.5 | 63.9 |

Figure 3:
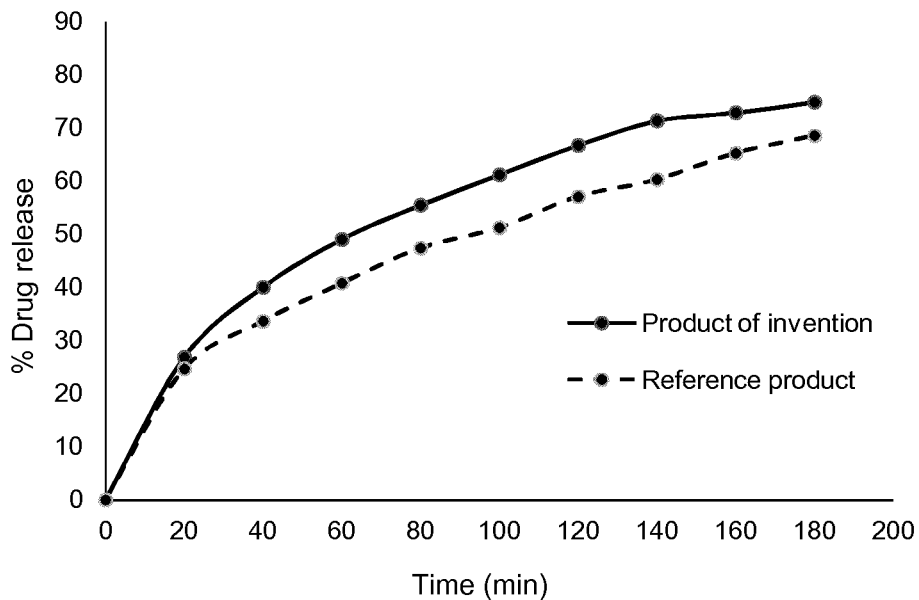
FIG. 3 shows comparative plots of the amount of pyridostigmine bromide released from tablets prepared by direct compression of hot-melt extruded powder and reference product at pH 4.5.

Table 3 and FIG. 3 show the comparative release at pH 4.5.

TABLE 3

Comparative release at pH 4.5

| | % PB released | | |
|---|---|---|---|
| Time (min) | Product of invention | Reference product | $f_2$ |
| 20 | 26.82 | 24.65 | 81.09 |
| 40 | 40.02 | 33.62 | 65.58 |
| 60 | 49.01 | 40.77 | 60.27 |
| 80 | 55.44 | 47.39 | 58.53 |
| 100 | 61.16 | 51.22 | 56.21 |
| 120 | 66.7 | 57.06 | 55.07 |
| 140 | 71.33 | 60.28 | 53.67 |
| 160 | 72.85 | 65.24 | 53.91 |
| 180 | 74.83 | 68.55 | 54.43 |

Figure 4:
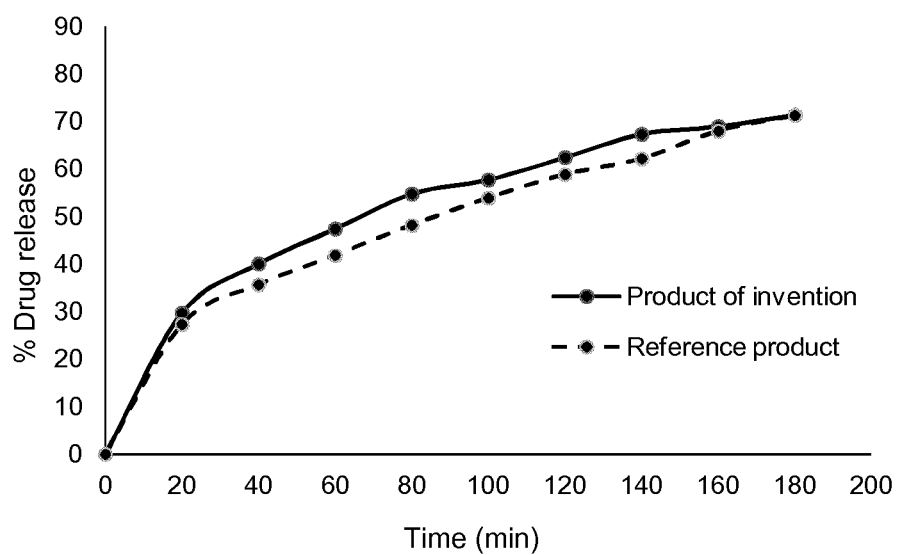
FIG. 4 shows comparative plots of the amount of pyridostigmine bromide released from tablets prepared by direct compression of hot-melt extruded powder and reference product at pH 6.8.

Table 4 and FIG. 4 show the comparative release at pH 6.8.

TABLE 4

Comparative release at pH 6.8

| | % PB released | | |
|---|---|---|---|
| Time (min) | Product of invention | Reference product | $f_2$ |
| 20 | 29.7 | 27.32 | 79.43 |
| 40 | 40.04 | 35.69 | 71.94 |
| 60 | 47.42 | 41.86 | 67.77 |
| 80 | 54.79 | 48.21 | 64.75 |
| 100 | 57.75 | 53.91 | 65.63 |
| 120 | 62.45 | 58.88 | 66.41 |
| 140 | 67.34 | 62.19 | 66.03 |
| 160 | 68.98 | 67.99 | 67.35 |
| 180 | 71.38 | 71.3 | 68.56 |

Figure 5:
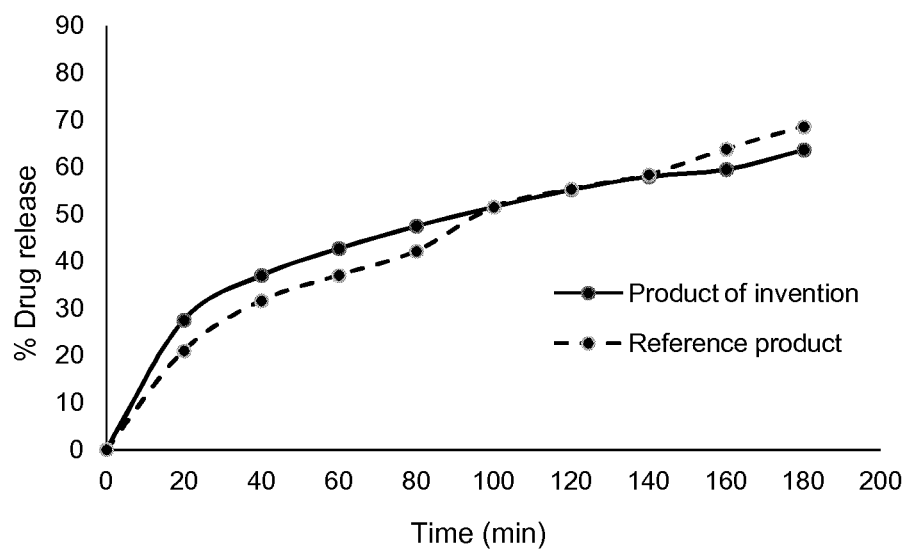
FIG. 5 shows comparative plots of the amount of pyridostigmine bromide released from tablets prepared by direct compression of hot-melt extruded powder and reference product at pH 7.4.

Table 5 and FIG. 5 show the comparative release at pH 7.4.

TABLE 5

Comparative release at pH 7.4

| | % PB released | | |
|---|---|---|---|
| Time (min) | Product of invention | Reference product | $f_2$ |
| 20 | 27.49 | 20.99 | 59.09 |
| 40 | 36.98 | 31.61 | 60.92 |
| 60 | 42.7 | 37.04 | 61.27 |
| 80 | 47.47 | 42.14 | 61.74 |
| 100 | 51.53 | 51.49 | 64.09 |
| 120 | 55.22 | 55.31 | 65.99 |
| 140 | 57.96 | 58.37 | 67.57 |

TABLE 5-continued

Comparative release at pH 7.4

| | % PB released | | |
|---|---|---|---|
| Time (min) | Product of invention | Reference product | $f_2$ |
| 160 | 59.49 | 63.81 | 67.58 |
| 180 | 63.64 | 68.56 | 67.26 |

The above results show that the tablets of the invention exhibit a dissolution profile which is similar to Mestinon® Timespan tablets over a wide range of pH.

Example 3. Moisture Uptake

This example shows the impact of the hot-melt extrusion process on the moisture uptake of tablets comprising the composition of the present invention.

The moisture uptake of the following tablets was tested:
1. Tablets of Kollidon® SR HME: These tablets consist of hot-melt extruded (HME) copolymer comprising polyvinyl acetate and polyvinylpyrrolidone in a ratio from 3:1 to 5:1 (Kollidon® SR). These tablets do not contain an active ingredient or other excipients.
2. Tablets of unprocessed Kollidon® SR: These tablets consist of copolymer comprising polyvinyl acetate and polyvinylpyrrolidone in a ratio from 3:1 to 5:1 (Kollidon® SR) which has not been subjected to hot-melt extrusion. These tablets do not contain an active ingredient or other excipients.
3. Tablets from compressed HME powder (tablets of the invention): These tablets contain 25% w/w pydidostigmine bromide, 60% w/w copolymer comprising polyvinyl acetate and polyvinylpyrrolidone in a ratio from 3:1 to 5:1 (Kollidon® SR) and 15% w/w microcrystalline cellulose.
4. Tablets from compressed powder of physical mixtures: These tablets contain 25% w/w pyridostigmine bromide, 60% w/w copolymer comprising polyvinyl acetate and polyvinylpyrrolidone in a ratio from 3:1 to 5:1 (Kollidon® SR) and 15% w/w microcrystalline cellulose.

The moisture content (MC) of the tablets was estimated from the weight increase (MC % on dry basis) by storing the tablets at 40% and 60% relative humidity (RH) inside a control humidity cabinet (Termaks, Norway, humidity generation by ultrasound). A different set of tablets was used for each of the two RH studied. Before testing, the tablets were kept for about one week in desiccator containing silica gel (corresponding to 20-23% RH) until constant weight, before they were transferred to increased RH environments.

The moisture content was calculated as percentage from the expression $$100 \times (\text{Weight at specific RH} - \text{Weight of dry sample}) / \text{Weight of dry sample}.$$

The results of the moisture uptake tests (mean values±standard deviation) are shown in Table 6.

TABLE 6

| Relative Humidity | Tablets of Kollidon SR HME | Tablets of unprocessed Kollidon SR | Tablets from compressed HME powder | Tablets from compressed powder of physical mixtures |
|---|---|---|---|---|
| | | | MC % | |
| RH = 40% | 2.36 ± 0.4 | 2.33 ± 0.06 | 2.24 ± 0.03 | 3.67 ± 0.20 |
| RH = 60% | 4.86 ± 0.5 | 4.07 ± 0.10 | 5.78 ± 0.12 | 6.63 ± 0.16 |

The results show that at both low and high examined RH levels the moisture content (MC %) of the tablets from compressed HME powder (tablets of the invention) was less than that of the tablets prepared from the physical mixtures of unprocessed powders with the same composition (2.24% compared to 3.67% at the low and 5.78 compared to 6.63% at the high RH level). From Table 2 it is also seen that the hot-melt extrusion treatment made no difference in the MC % of Kollidon SR polymer (first two columns of Table 2). Therefore, the lower MC % of the tablets of the invention compared to the tablets prepared from physical mixtures should be due to the lower uptake of water vapour by the active ingredient in the tablet. This means that the tablets of the invention provide better protection of the active ingredient to environmental humidity than the physical mixture tablet.

Example 4. Moisture Uptake

This example shows a comparison of the moisture uptake between tablets of the invention and Mestinon® Timespan tablets.

The moisture content was measured at two relative humidities 40% and 60% at 20-22° C.

About 1 gram accurately weighted samples in plastic discs, i.e, tablets of Example 2 (tablets of the invention) and Mestinon® Timespan tablets, were placed in dessicator containing phosphorus pentoxide for one week to constant weight. Then the samples were transferred to humidity cabinet (Termaks, Norway, humidy generation by ultrasound) set to 40% and 20° C. and the weight loss after 2 days equilibration was recorded. Subsequently the cabinet was set to 60% RH and 20° C. and the weight loss after equilibration for 2 days was recorded. The moisture content was calculated in the same way as in Example 3.

The results of these tests are shown in Table 7.

TABLE 7

| Relative Humidity | Tablets of the invention | | Mestinon ® Timespan tablets | |
|---|---|---|---|---|
| | MC % | | | |
| | Mean (n = 3) | STDEV | Mean (n = 3) | STDEV |
| RH = 40% | 2.24 | 0.03 | 2.66 | 0.26 |
| RH = 60% | 6.72 | 0.04 | 6.86 | 0.20 |

The results show that the moisture absorption of the tablets of the invention is lower that the moisture absorption of the commercially available Mestinon® Timespan tablets.

Example 5. Physical Properties of Tablets

This example shows physical properties of pyridostigmine bromide tablets made from hot-melt extruded powder (HME tablets) or from powder containing the same ingredients which have not been subjected to hot-melt extrusion (Tablets from physical mixtures).

The composition of the tablets comprising pyridostigmine bromide, polyvinyl acetate and polyvinylpyrrolidone in a ratio from 3:1 to 5:1 (Kollidon® SR) and microcrystalline cellulose (Avicel pH 102) is shown on Table 8.

TABLE 8

| Component | Weight percentage (% w/w) |
| --- | --- |
| Pyridostigmine bromide | 25 |
| Kollidon SR | 60 |
| Avicel pH 102 | 15 |
| Total | 100 |

The mechanical properties of the matrices were determined after measurement of their dimensions by recording the diametrically loading-deformation profiles until breaking. The CT-5 testing machine (Engineering System, Nottingham, UK) was used, fitted with 500 kg load cell.

Tensile strength (T) which is used to normalize the breaking load to account for any differences in tablet dimensions was calculated from the equation (Fell and Newton 1971):

$$T = 2F\pi/\Phi t$$

where F is the breaking load, $\Phi$ the compact diameter and t its thickness.

Table 9 shows the physical dimensions (diameter and thickness) the weight and the mechanical properties of the tablets.

TABLE 9

| Type of tablet | Diameter/thickness (mm) | Tablet weight (mg) | Breaking load (Kg) | Tensile strength (MPa) |
| --- | --- | --- | --- | --- |
| HME tablets | 13/4.60 | 717 | 36.4 (1.0) | 3.92 (0.11) |
| Tablets from physical mixtures | 13/4.90 | 746 | 27.2 (1.8) | 2.66 (0.17) |

The results of Table 9 show that the hot-melt extruded powder produces stronger tablets than the powder containing the same ingredients which however have not been subjected to hot-melt extrusion.

The invention claimed is:

1. A sustained release pharmaceutical composition comprising (i) a therapeutically effective amount of pyridostigmine or a pharmaceutically acceptable salt thereof, (ii) a diluent, and (iii) a copolymer comprising polyvinyl acetate and polyvinylpyrrolidone in a ratio from 3:1 to 5:1, wherein the composition is produced by hot-melt extrusion.

2. A sustained release pharmaceutical composition according to claim 1, wherein the pharmaceutically acceptable salt of pyridostigmine is pyridostigmine bromide.

3. A sustained release pharmaceutical composition according to claim 1, wherein the diluent is selected from microcrystalline cellulose, lactose, calcium phosphate salts, hydrophilic colloids, polysaccharides, or mixtures thereof.

4. A sustained release pharmaceutical composition according to claim 1, wherein the diluent is microcrystalline cellulose.

5. A sustained release pharmaceutical composition according to claim 1, wherein the copolymer concentration in the composition is from 50% w/w to 70% w/w.

6. A sustained release pharmaceutical composition according to claim 5, wherein the copolymer concentration in the composition is from 60% w/w to 65% w/w.

7. A sustained release pharmaceutical composition according to claim 1, wherein the diluent concentration in the composition is from 5% w/w to 25% w/w.

8. A sustained release pharmaceutical composition according claim 7, wherein the diluent concentration in the composition is from 10% w/w to 15% w/w.

9. A sustained release pharmaceutical composition according to claim 1, wherein the concentration of pyridostigmine or a pharmaceutically acceptable salt thereof in the composition is from 5% w/w to 45% w/w.

10. A sustained release pharmaceutical composition according to claim 9, wherein the concentration of pyridostigmine or a pharmaceutically acceptable salt thereof in the composition is from 15% w/w to 35% w/w.

11. A sustained release pharmaceutical composition according to claim 1, wherein the composition further comprises a plasticizer, a taste improving agent, a bioadhesive or a porogenic substance.

12. A unit dosage form comprising the composition of claim 1.

13. A unit dosage form according to claim 12, wherein the dosage form is selected from a tablet or a capsule.

14. A unit dosage form according to claim 12, wherein the dosage form is a tablet.

* * * * *